United States Patent [19]
Voss

[11] Patent Number: 5,232,717
[45] Date of Patent: Aug. 3, 1993

[54] PREFORM CARRYING APPARATUS

[75] Inventor: Hermann Voss, Löhrsweg, Fed. Rep. of Germany

[73] Assignee: Nissei ASB Machine Co., Ltd., Nagano, Japan

[21] Appl. No.: 790,166

[22] Filed: Nov. 12, 1991

Related U.S. Application Data

[62] Division of Ser. No. 512,832, Apr. 23, 1990, Pat. No. 5,110,282.

[51] Int. Cl.⁵ .............................................. B29C 49/42
[52] U.S. Cl. ................................. 425/534; 198/803.12; 414/744.6
[58] Field of Search ................... 425/522, 534; 414/744.5, 744.6; 198/803.12, 803.8; 294/93

[56] References Cited

U.S. PATENT DOCUMENTS

| | | | |
|---|---|---|---|
| 2,468,255 | 4/1949 | Dunn | 414/744.5 |
| 2,649,659 | 8/1953 | Kahle | 425/534 X |
| 3,995,745 | 12/1976 | Chambers | 414/744.6 |
| 4,086,999 | 5/1978 | McDonald | 198/803.12 X |
| 4,241,009 | 12/1980 | Sokolow | 264/532 |
| 4,382,760 | 5/1983 | Wiatt et al. | 425/534 X |
| 4,391,578 | 7/1983 | Schaar | 425/534 X |
| 4,456,447 | 6/1984 | Smith | 425/534 X |
| 4,507,039 | 3/1985 | Sawa et al. | 414/152 |

FOREIGN PATENT DOCUMENTS

| | | |
|---|---|---|
| 0001626 | 5/1979 | European Pat. Off. . |
| 3837118A1 | 5/1990 | Fed. Rep. of Germany . |
| 2346256 | 2/1983 | France . |
| 2521480 | 8/1983 | France . |
| 50-89470 | 7/1975 | Japan . |
| 61-188325 | 8/1986 | Japan . |
| 1-297231 | 11/1989 | Japan . |
| WO90/03868 | 4/1990 | PCT Int'l Appl. . |
| 2097322 | 11/1982 | United Kingdom . |

Primary Examiner—Richard L. Chiesa
Attorney, Agent, or Firm—Oliff & Berridge

[57] ABSTRACT

A preform carrying apparatus including: a rotary disk; a fixed plate disposed opposite to the rotary disk; first and second cams provided on the fixed plate; a support arm which can freely expand and contract in the radial direction from the rotary disk, the base end of which is rockably supported by the rotary disk, and which is provided with a first cam follower which is guided by the first cam and a second cam follower which is guided by the second cam; and a coupling disposed at the forward end of the support arm so as to removably support the neck portion of the preform. The support arm is expanded and contracted in the longitudinal direction in accordance with the trailing position of the first cam follower and rocked around the base end as the fulcrum in accordance with the trailing position of the second cam follower. The feeding of the preform can be accelerated, decelerated or stopped during the continuous rotation of the rotary disk.

10 Claims, 12 Drawing Sheets

PREFORM CARRYING APPARATUS

This is a division of application Ser. No. 07/512,832, filed Apr. 23, 1990, now U.S. Pat. No. 5,110,282.

BACKGROUND OF THE INVENTION

1. Field of the Invention

The present invention relates to a preform carrying apparatus for carrying a preform along a passage on which working stations are provided.

2. Description of the Related Art

In order to form a hollow product such as a bottle as a final product, an apparatus for blow molding a preform (also called a "parison") obtained in advance by injection molding is adopted. The apparatus disclosed in Japanese Patent Laid-Open No. 89470/1975 is provided with a first passage which is capable of carrying a preform while rotating and heating it, and a second passage which receives the preform supplied from the first passage and carries a plurality of radially arranged blow molds while rotating them. In this apparatus, it is difficult to supply air and electric power to the blow molds carried under rotation, resulting in an expensive equipment cost. In this respect, the apparatus disclosed in Japanese Patent Laid-Open No. 297231/1989 is more advantageous. In this apparatus, a preform receiving station, a heating station, a blow molding station and an ejecting station are disposed on an endless passage in a fixed state and a preform is carried along the passage.

In carrying a preform to each working station, since it is necessary to stop feeding the preform during the processing time at each working station, it is necessary to carry preforms intermittently.

In the case of intermittent feeding, it is necessary to set the feeding stop time at the maximum processing time at one working station. It is therefore necessary to stop the feeding of a preform to each working station during a heating process, which generally takes the longest processing time, so that a long forming cycle is disadvantageously required. In addition, since the feeding stop time is determined by the processing time at one working station, setting of working conditions such as heating conditions at other working stations becomes very complicated. Furthermore, the control of intermittent feeding is more complicated than the control of continuous feeding and increases power consumption.

SUMMARY OF THE INVENTION

Accordingly, it is an object of the present invention to eliminate the above-described problems in the related art and to provide a preform carrying apparatus which is capable of stopping a preform at a working station while continuously rotating a rotary disk and which is capable of feeding a preform on a passage with acceleration or deceleration by adopting a novel feeding system.

It is another object of the present invention to provide a preform carrying apparatus having a simple and highly reliable structure in which the continuous rotational force of a rotary disk expands and contracts a support arm for feeding a preform and accelerates, decelerates and stops the feeding of the preform by means of cams and cam followers.

It is still another object of the present invention to provide a preform carrying apparatus which is capable of connecting and releasing a preform in a short time by improving the coupling structure for holding the preform, thereby contributing to the shortening of the forming cycle.

To achieve this aim, the present invention provides a preform carrying apparatus for carrying a preform along a passage on which working stations are provided, the apparatus comprising:

a rotary disk;

a fixed plate disposed opposite to the rotary disk;

first and second cams provided on the fixed plate;

a support arm which can freely expand and contract in the radial direction from the rotary disk, the base end of which is rockably supported by the rotary disk, and which is provided with a first cam follower which is guided by the first cam and a second cam follower which is guided by the second cam; and a coupling disposed at the forward end of the support arm so as to removably support the neck portion of the preform;

the support arm being expanded and contracted in the longitudinal direction in accordance with the trailing position of the first cam follower and rocked around the base end as the fulcrum in accordance with the trailing position of the second cam follower, thereby enabling the acceleration, deceleration and stopping of the feeding of the preform.

According to the present invention, since the base end of the support arm is supported by the rotary disk, the base end is continuously rotated integrally with the rotary disk. The support arm, however, does not continuously feed the preform which is held at the forward end thereof at an equal speed due to the relationships between the first cam and the first cam follower, and the second cam and the second cam follower, but is rocked around the base end as a fulcrum and expanded or contracted, if necessary, thereby enabling the acceleration and deceleration of the feeding of the preform. It is also possible to stop the preform on the passage by a combination of the rocking motion, expansion and contraction of the support arm.

The first cam expands the support arm when the distance between the first cam and the trailing position of the first cam follower is long and contracts the support arm when the distance is short.

The second cam accelerates the movement of the support arm by keeping the trailing position of the second cam follower at a distance from the center of rotation of the rotary disk in accordance with the rotation of the rotary disk, and decelerates the movement of the support arm by bringing the trailing position of the second cam follower close to the center of rotation of the rotary disk in accordance with the rotation of the rotary disk.

The support arm is composed of a rocking portion which rocks with respect to the rotary disk in accordance with the trailing position of the second cam follower, a rod which is linearly movably supported by the rocking portion and which supports a coupling at the forward end thereof, a linearly moving portion which is supported by the rocking portion in such a manner as to be linearly movable in the same direction as the rod in accordance with the trailing position of the first cam follower, and a guide driving mechanism for linearly guiding the rod in accordance with the movement of the linearly moving portion. If the guide driving mechanism fixes the linearly moving portion to the rod, the rod stroke is constantly equal to the stroke of the linearly moving portion, so that unless the position of the first cam is distant from the locus of rotation of the base end of the support arm, it is impossible to secure a predetermined expanding and contracting stroke, which means a great enlargement of the outer periphery of the fixed plate.

Therefore, a guide driving mechanism which can make the moving stroke of the rod larger than the moving stroke of the linearly moving portion is preferable. Such a guide driving mechanism is composed of, for example, a first link with one end thereof rotatably connected to the rocking portion, a second link with one end thereof rotatably connected to the forward end of the rod and the other end thereof rotatably connected to the other end of the first link and a third link with one end thereof rotatably connected to the linearly moving portion and the other end thereof rotatably connected to a part of the first link.

If a fixed shaft for supporting the fixed plate and a hollow rotary shaft coaxial with and disposed around the fixed shaft are provided, and the rotary disk is fixed at the upper end of the hollow rotary shaft below and in parallel with the fixed plate, it is possible to make the apparatus comparatively compact.

In this case, the fixed plate is provided with a first cam groove and a second cam groove as endless passages on the surface facing the rotary disk, and the first and second cam followers are formed as rollers which travel the corresponding cam grooves, thereby realizing a smooth drive of the support arm.

In the present invention, the coupling structure for holding the neck portion of a preform is also improved.

The coupling for a preform is composed of: a plurality of clamps which surround the neck portion of the preform so as to hold it, and which are hinged on the neck portion so as to be released by rotation; and a rotation control mechanism for rotating each of the clamps in the direction which brings the clamps close to each other and in the direction which separates the clamps from each other, so that when the plurality of clamps rotate so as to approach each other, they surround the neck portion, while when they rotate so as to separate from each other, they are released from the neck portion. Since the rotational operation of the clamps is comparatively swiftly carried out, it is possible to receive and eject the preform swiftly, thereby contributing to the shortening of the forming cycle.

If a receiving portion which comes into contact with the under surface of the large-diameter portion formed below the neck portion is provided, it is possible to safely prevent the drop of the preform.

If each of the clamps is hinged on a fixed cylinder, and the rotation control mechanism composed of a slip ring which vertically moves along the fixed cylinder and a lever with both ends thereof rotatably supported by the slip ring and the fixed cylinder, respectively, is used, the clamps are rotated so as to separate from each other when the slip ring is elevated while the clamps are rotated so as to approach each other when the slip ring is lowered.

If the imaginary line connecting the upper rotational point at which the lever is connected to the slip ring and the lower rotational point at which the lever is connected to the clamp is so selected as not to pass the hinged portion of the clamp and the fixed cylinder either in the state in which the clamps are rotating so as to approach each other or in the state in which the clamps are rotating so as to separate from each other, it is possible to prevent the lever from being situated at the dead point in the state of being unable to be driven.

If a spring which presses the slip ring so as to be constantly lowered is provided, it is possible to maintain the clamps in the state of being close to each other, in other words, the preform holding state. It is possible to rotate the clamps so as to separate from each other by a slip ring push-up member provided on a working station.

If a vertically movable cylinder is provided on the inside of the fixed cylinder, it is possible to introduce a pressure medium for blow molding while maintaining the close contact state of the neck portion. It is also possible to provide a packing for maintaining the airtightness at the lower end of the movable cylinder. If flanges are formed at the upper end of the fixed cylinder and at the upper end of the movable cylinder which protrudes upwardly from the fixed cylinder, a spring is provided between the flanges and a member for pressing down the flange of the movable cylinder is provided at the blow molding station, it is possible to safely prevent the leakage of the pressure medium.

Such improvement of the coupling is not restrictively applied to a carrying apparatus which accelerates, decelerates and stops the feeding operation of the support arm and when it is applied to an apparatus which adopts another feeding system, it can also contribute to the shortening of the forming cycle.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of the present invention will be explained in detail with reference to the accompanying drawings.

Figure 2:
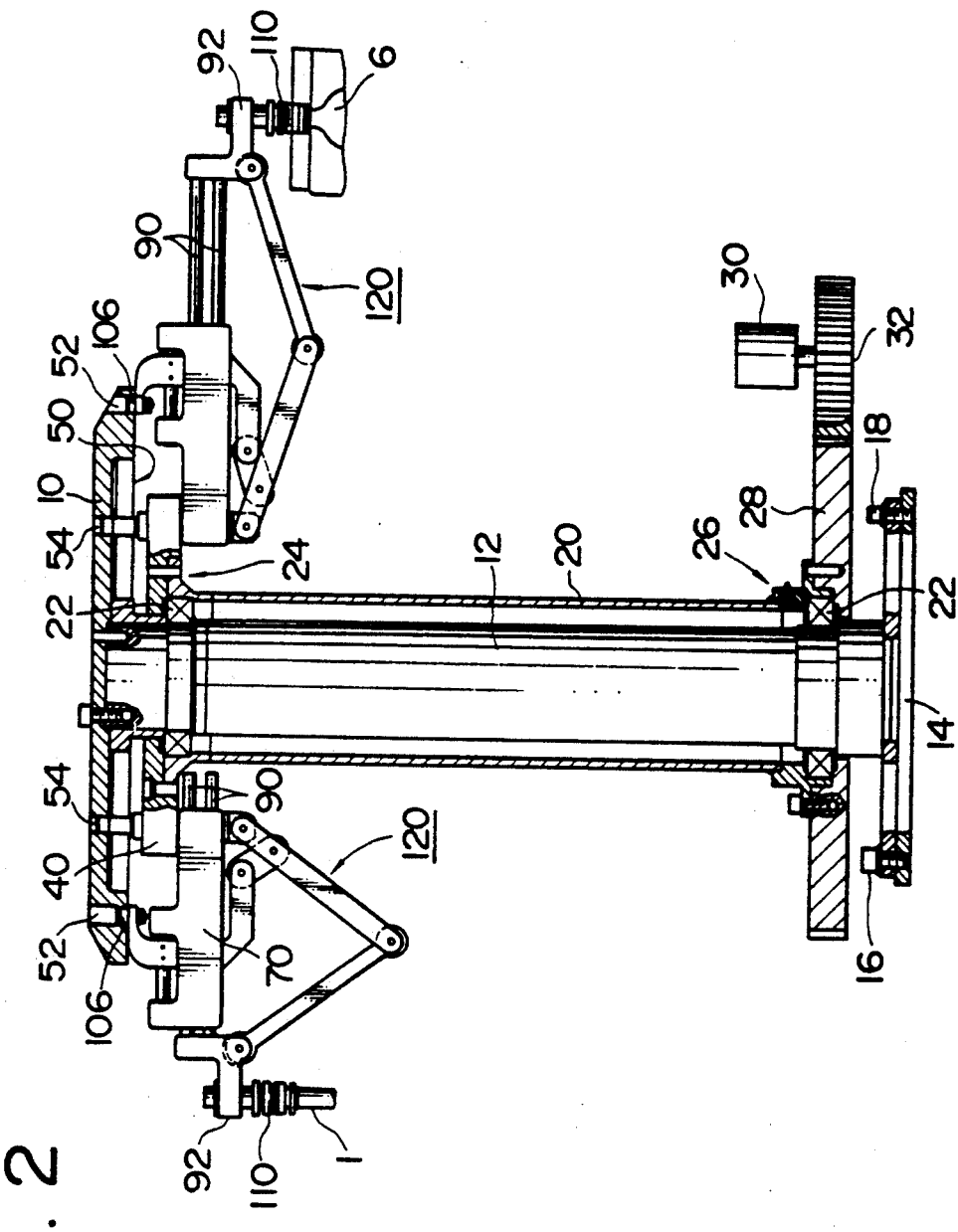
FIG. 2 is a schematic vertical sectional view of the carrying apparatus shown in FIG. 1.

In FIG. 2, a circular fixed plate 10 is firmly connected to a fixed shaft 12. The fixed shaft 12 is fixed to the bottom portion of the apparatus by bolts 16 and 18.

Around the fixed shaft 12, a hollow rotary shaft 20 is coaxially and rotatably supported through bearings 22. The hollow rotary shaft 20 has a rotary disk 40 at the upper end 24 thereof and the rotary disk 40 is firmly connected to the hollow rotary shaft 20 in such a manner as to be rotatable around the fixed shaft 12 together with the hollow rotary shaft 20. A driving pinion 28 is fixed to the lower end 26 of the hollow rotary shaft 20. The driving pinion 28 is intermeshed with a motor pinion 32 which is fixed to the output shaft of a motor 30.

The under surface of the fixed plate 10 which faces the rotary disk 40 constitutes a cam plate 50 within which a first cam 52 and a second cam 54 having different paths are provided. In this embodiment, the first and second cams 52, 54 constitute cam grooves, the shapes of which will be explained later.

Figure 1:
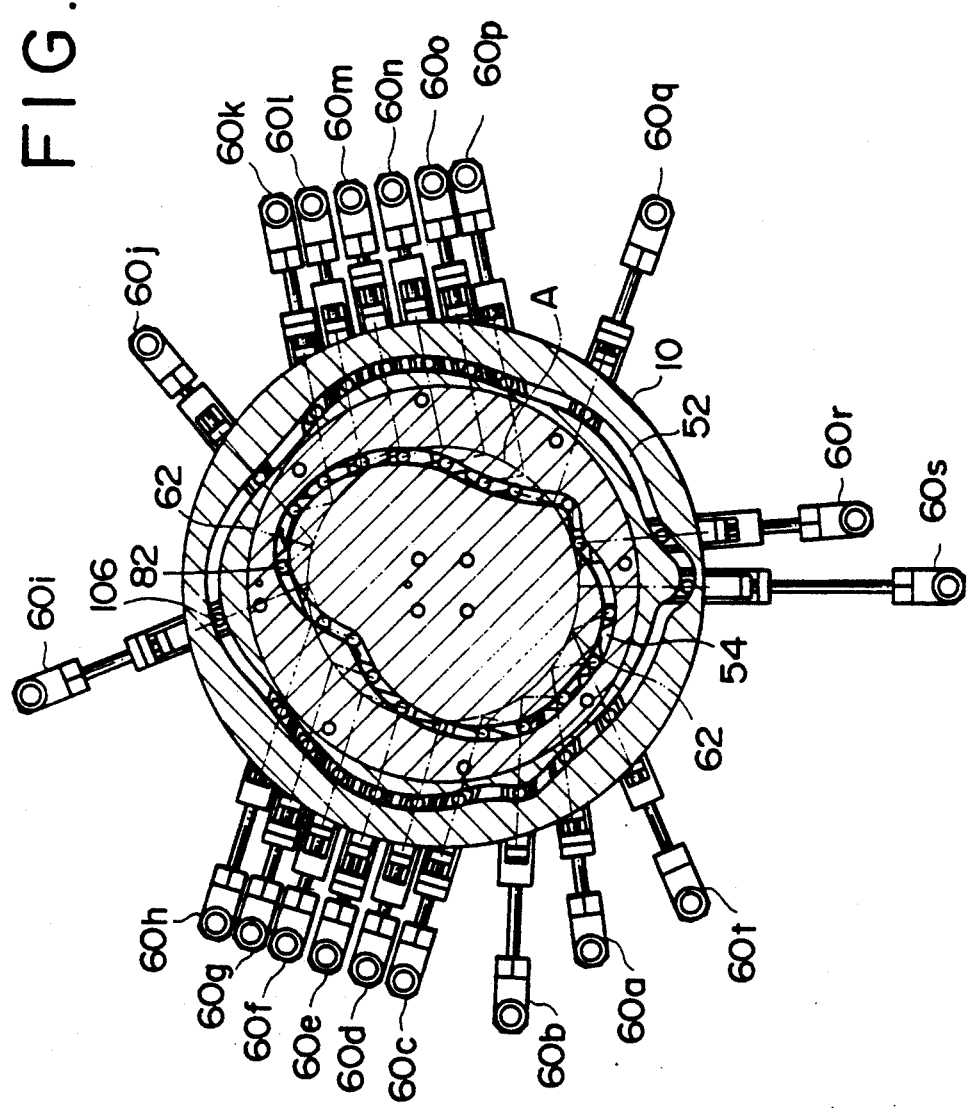
FIG. 1 is a cross sectional view of the main part for accelerating, decelerating and stopping the feeding operation of a support arm in an embodiment of a preform carrying apparatus according to the present invention.
Figure 3:
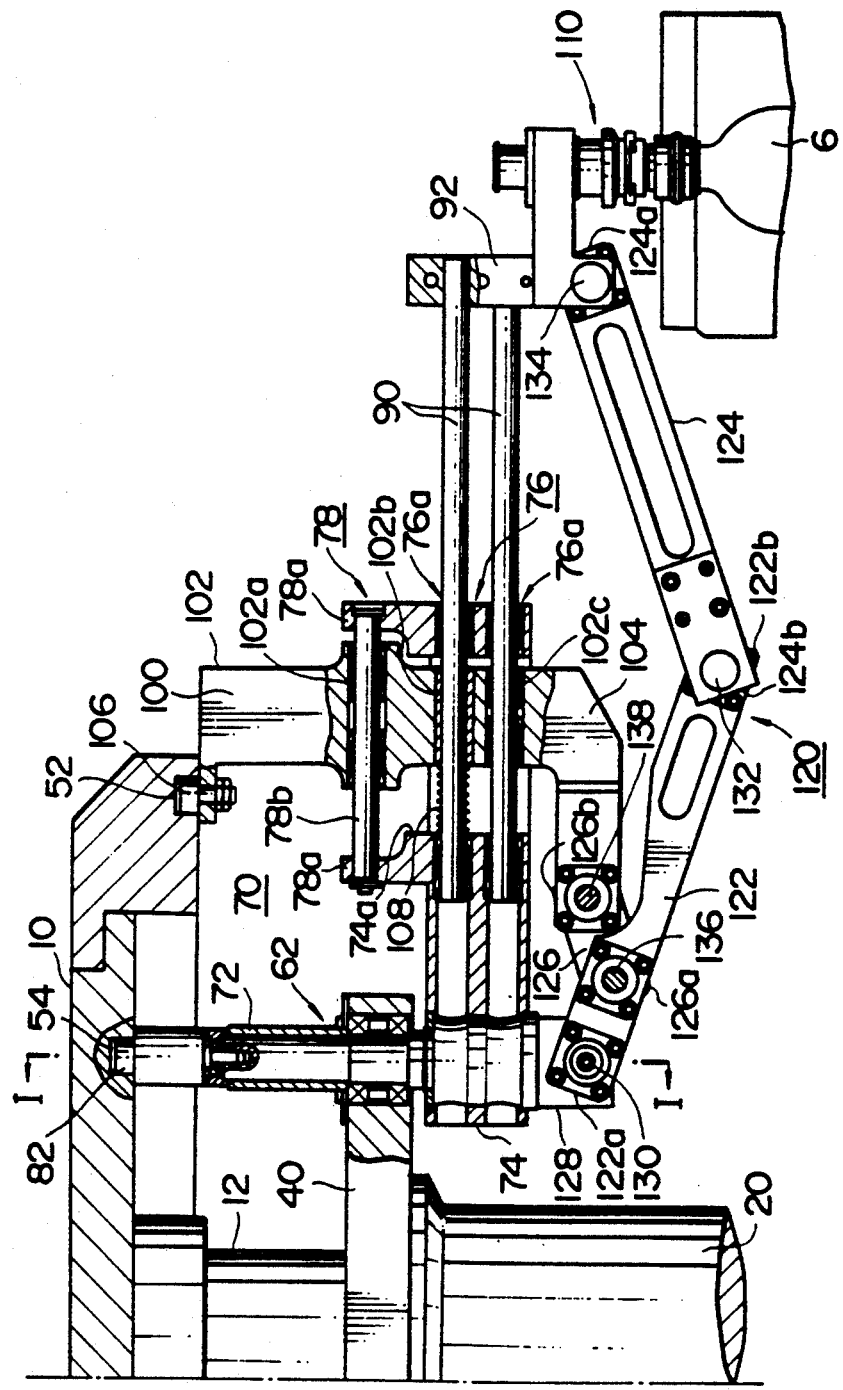
FIG. 3 is a sectional view of the support arm shown in FIG. 1.

As shown in FIG. 1, the rotary disk 40 is provided with a plurality of, for example, 20 support arms 60 (60a to 60t) which extend radially therefrom. The base ends 62 of the respective support arms 60 are disposed at regular intervals on the rotary disk 40 and are rockably supported by the rotary disk 40. The support arm 60 can be expanded and contracted in the axial direction by the later-described structure. As shown in FIG. 3, the support arm 60 is composed of a rocking portion 70 which is rockably attached to the rotary disk 40 and is rocked by a second cam follower 82 which follows the path of the second cam 54, two rods 90 linearly movably supported by the rocking portion 70, a linearly moving portion 100 connected to a first cam follower 106 which follows the path of the first cam 52 and supported by the rocking portion 70 in such a manner as to be linearly movable in the same direction as the rods 90, a coupling 110 which is fixed at the forward ends of the rods 90 in such a manner as to removably hold a preform 1 and a guide driving mechanism 120 for linearly guiding the rods 90.

Each of the support arms 60a to 60t has a rocking shaft 72 at the base end 62 which is rotatably supported by the rotary disk 40, as shown in FIG. 3. A guide section 74 is fixed to the rocking shaft 72. The guide section 74 has a first guide portion 76 composed of two holes 76a and movably support the two rods 90. The guide section 74 is also provided with a second guide portion 78 which includes a pair of separate support pieces 78a protruding from the upper end of the first guide portion 76 and a guide shaft 78b fixed between the pair of guide pieces 78a. The linearly moving portion 100 is linearly movably supported by the guide shaft 78b. A support section 92 is fixed to the forward ends of the rods 90 which are guided by the guide section 74. The coupling 110 is provided in the support section 74. By the use of the coupling 110, the preform 1 is grasped and carried on a predetermined passage.

Figure 4:
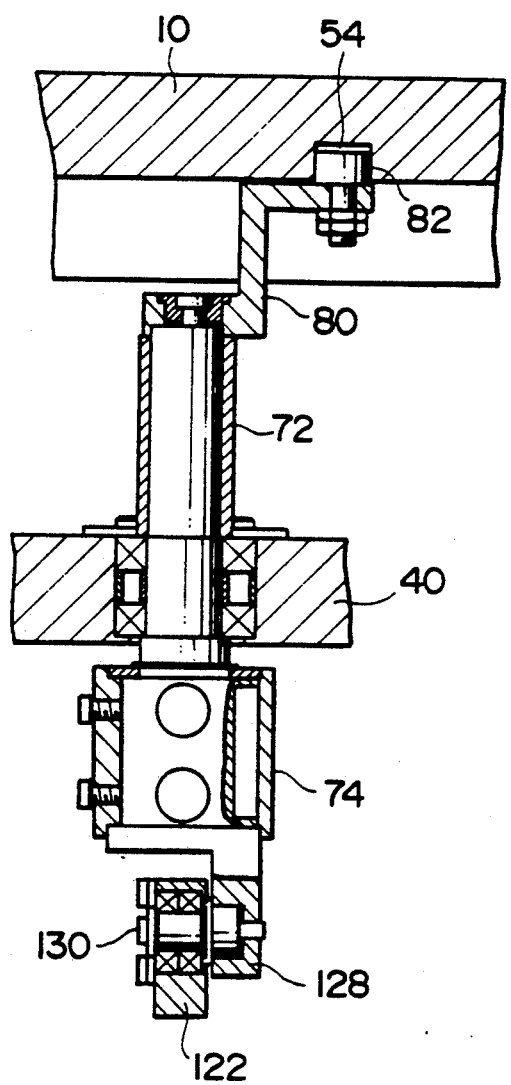
FIG. 4 is a sectional view of the support arm shown in FIG. 3, taken along the line I—I.

A crank-shaped rocking arm 80 is fixed to the upper end of the rocking shaft 72, as shown in FIG. 4. The second cam follower 82 which follows the path of the second cam 54 is provided at the upper end of the rocking arm 80. The second cam follower 82 functions as a roller which rotates with respect to the rocking arm 80. In this way, the rocking shaft 72 can rock with respect to the rotary disk 40 by the displacement of the rocking arm 80.

The rocking motion is uniformly determined by the position of the rocking shaft 72 at the base end of the support arm 60 and the trailing position of the second cam follower 82, so that by controlling these positions, the acceleration and deceleration of the feeding operation of the support arm 60 are realized.

Figure 5A:
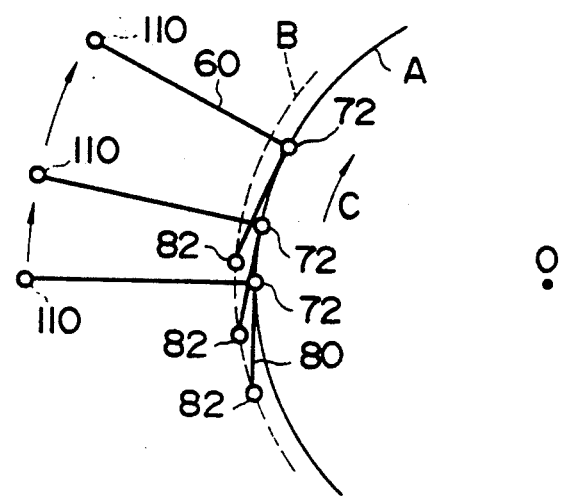
FIGS. 5A–5C are a schematic explanatory view of the acceleration and deceleration of the feeding operation of the support arm.
Figure 5B:
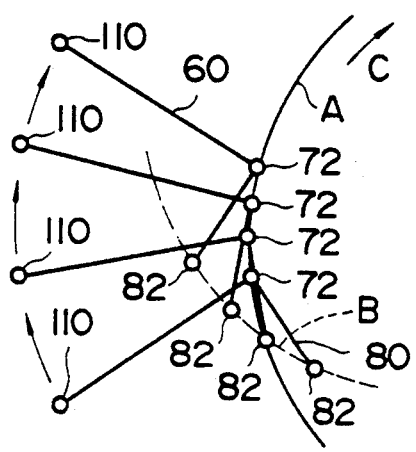
Figure 5C:
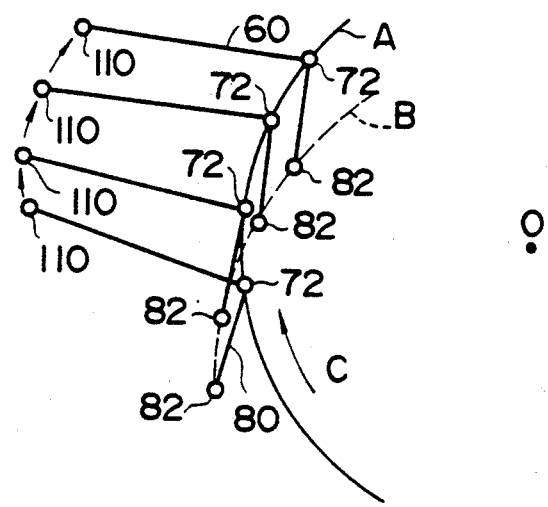

The rocking motion will be explained with reference to FIGS. 5(A)-5(C). FIGS. 5(A)-5(C), the symbol A represents the locus of the movement of the base end 62 of the support arm, namely, the rocking shaft 72, O the center of rotation of the rotary disk 40 and C the direction of rotation of the rotary disk 40. In this embodiment, the direction of the rocking arm 80 is orthogonal to the direction in which the support arm 60 extends, but these directions may intersect at another angle. When the locus B of trailing of the second cam follower draws a circle concentrical with the locus A of the movement, as shown in FIG. 5(A), the support arm 60 moves at an equal speed to that of the rotary disk 40. If the distance between the trailing position of the second cam follower 82 and the center O of rotation increases (the locus B of the trailing is outside of the locus A of the movement), as shown in FIG. 5(B), the acceleration of the movement of the support arm 60 is realized. On the other hand, if the distance between the trailing position of the second cam follower 82 and the center O of rotation decreases (the locus B of the trailing is inside of the locus A of the movement), as shown in FIG. 5(C), the deceleration of the movement of the support arm 60 is realized. It is also possible to stop the preform 1 at a certain position by decelerating the movement of the support arm 60 such that the forward end of the support arm 60 remains at the same position and expanding or contracting the support arm 60 as will be described later. The shape of the curve of the second cam 54 is so determined as to enable such acceleration and deceleration. For example, the second cam 54 takes the form of a groove, as shown in FIG. 1.

The linearly moving portion 100 is formed into an L shape provided with a long leg 102 which extends in the vertical direction and a short leg 104 which extends in the horizontal direction, as shown in FIG. 3. The first cam follower 106 is provided at the upper end of the long leg 102. The first cam follower 106 functions as a roller rotatable with respect to the long leg 102 and follows the path of the first cam 52. The long leg 102, which is movably supported by the second guide 78 of the guide section 74, is provided with a slot 102a through which the guide shaft 78b is run. The long leg 102 also has slots 102b and 102c through which the rods 90 are run so as to prevent the rods 90 from being interfered with each other. A compressed coil spring 108 is disposed around one of the rods 90 and between the inner end surface 74a of the guide section 74 and the long leg 102 which faces the inner end surface 74a, thereby urging the linearly moving portion 100 to keep away from the fixed shaft 12.

The expanding and contracting stroke of the support arm 60 is obtained by expanding the moving stroke of the linearly moving portion 100 which moves in combination with the second cam follower 106 by the guide driving mechanism 120.

The guide driving mechanism 120 is composed of three links, namely, a first link 122, a second link 124 and a third link 126. The end portion 122a of the first link 122 is supported by the rocking shaft 72. The rocking shaft 72 rotatably supports a rotary head 128 at the lower end thereof. The first link 122 is rockably supported by the rotary head 128 through a rocking pivot 130.

A rocking pivot 132 is provided at the other end portion 122b of the first link 122 so as to rockably connect the end portions 122b and 124b of the first and second links 122 and 124, respectively, to each other therethrough. The second link 124 has a rocking pivot 134 at the other end 124a and is rockably supported by the support section 92 through the rocking pivot 134.

The third link 126 is further rockably supported by the first link 122 through a rocking pivot 136 at the end portion 126a, and rockably supported by the short leg 104 of the linearly moving portion 100 through a rocking pivot 138 at the other end 126b. Consequently, the reciprocation of the linearly moving portion 100 is transmitted to the support section 92 by the guide driving mechanism 120 in correspondence with the lengths of the respective links 122, 124 and 126.

Such a reciprocation is caused by changing the distance between the base end 62 of the support arm 60, namely, the rocking shaft 72 and the first cam follower 106. The position of the preform 1 which is supported by the forward end of the support arm 60 is also changed by the rocking motion of the support arm 60 which is caused by the action of the second cam follower 82. Therefore, the preform 1 is not always the most distant from the center of rotation when the support arm 60 is expanded to its maximum. Therefore, it is necessary to determine the degree of expansion and contraction of the support arm 60 for prescribing the distance of the preform 1 from the center of rotation with due consideration of the advance of the second cam follower 106 which follows the path of the second cam 54. The shape of the groove of the first cam 52 shown in FIG. 1 is so determined as to realize a predetermined passage of the preform 1 with consideration of the shape of the second cam 54. The first cam 52 draws a curve which passes the vicinity of the periphery of the fixed plate 10 and defines one stroke, thereby suppressing the movement of the coupling 110 which would otherwise get away from the fixed shape 12 at each position of the support arm 60. In this way, it is possible to control the forward ends (the plurality of preforms 1) of the support arms 60 each other which radially extend from the fixed shaft 12 by the rocking motions caused through the rocking shafts 72 in cooperation with the deviations of the preforms 1 from the center of the rotation caused by the operation of the first cams 52.

The preform 1 carrying operation will next be schematically explained. The motor 30 is driven so as to pass the preform 1 through a predetermined passage with various working stations provided thereon. The driving force of the motor 30 is transmitted to the rotary disk 40 through the pinions 32, 28 and the hollow rotary shaft 20. The rotary disk 40 integrally rotates the rocking shaft 72 at the base end of the support arm 60. The position of the coupling 110 at the forward end of the support arm 60 is controlled by the actions of the first and second cam followers 106, 82 which follow the paths of the first and second cams 52, 54, respectively, and act on the support arm 60. More specifically, the support arm 60 is rocked in accordance with the positional relationship between the second cam follower 82 and the rocking shaft 72. The linearly moving portion 100 reciprocate in accordance with the position of the first cam follower 106, the reciprocation being realized as the reciprocation of the support arm 60 which is in correspondence with the reduction ratio of the guide driving mechanism 120. By the composite motion of the rocking motion of the rocking shaft 72 and the reciprocating motion of the linearly moving portion 100 and the guide driving mechanism 120, the preform 1 is guided on the passage determined by the first and second cams 52, 54 through the respective working stations.

Examples of the arrangement of the working stations provided on the passage will now be explained.

Figure 6:
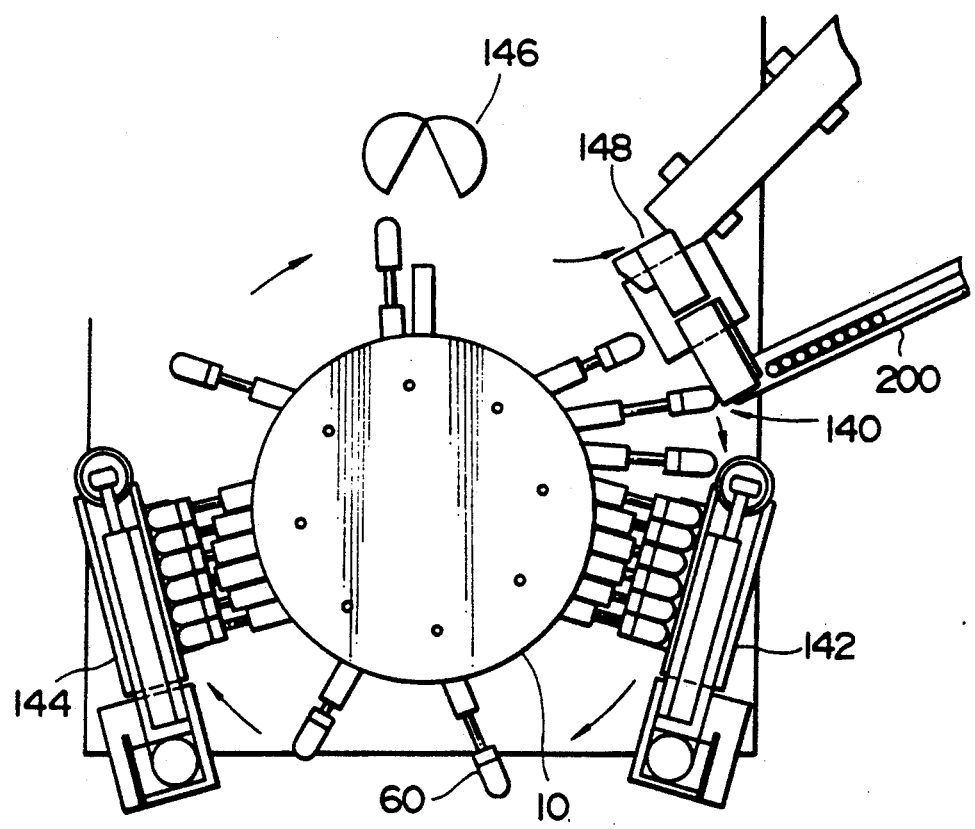
FIG. 6 is a schematic plan view of the carrying apparatus shown in FIG. 1.

In FIG. 6, a preform receiving station 140, a first heating station 142, a second heating station 144, a stretching blow molding station 146 and an ejecting station 148 are disposed on the passage in the direction of rotation of the preform 1. In the first and second heating stations 142, 144, the movement of the support arm 60 is decelerated and the support arm 60 is expanded or contracted in order to feed the preforms 1 in alignment to the direct heating zone. In the stretching blow molding station 146, the preform 1 is stopped during a predetermined processing time. In the preform receiving station 140 and the ejecting station 148, the support arm 60 is decelerated or stopped for the respective operations. In the other carrying zone, the movement of the support arms 60 is accelerated or decelerated so as to enable swift and smooth operations at the respective stations.

Figure 7:
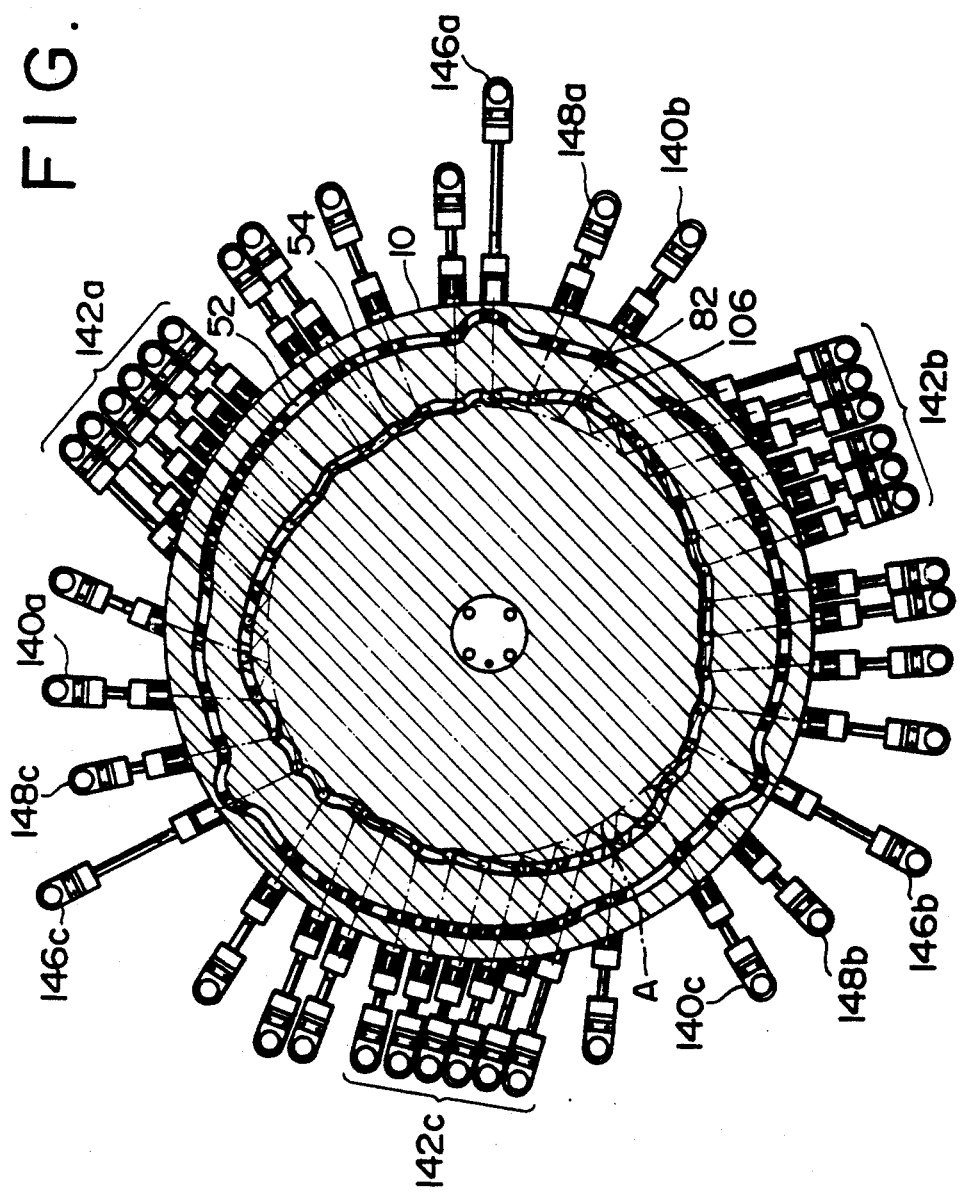
FIG. 7 is a partially cutaway view of a carrying apparatus with three working stations having the same function provided on the passage.

In FIG. 7, a plurality of, for example, three stretching blow molding stations 146a to 146c are provided at three portions, and heating stations 142a to 142c and preform receiving stations 140a to 140c are provided on the fore-stage side of the carrying process and ejecting stations 148a to 148c are provided on the rear-stage side of the carrying process. In this case, the diameters of the rotary disk 40 and the fixed plate 10 are enlarged in order to secure the pitch of the support arms. The carrying operation is so controlled that the preform 1 is subjected to the molding operation at one of the stretching blow molding stations 146a to 146c.

Figure 8:
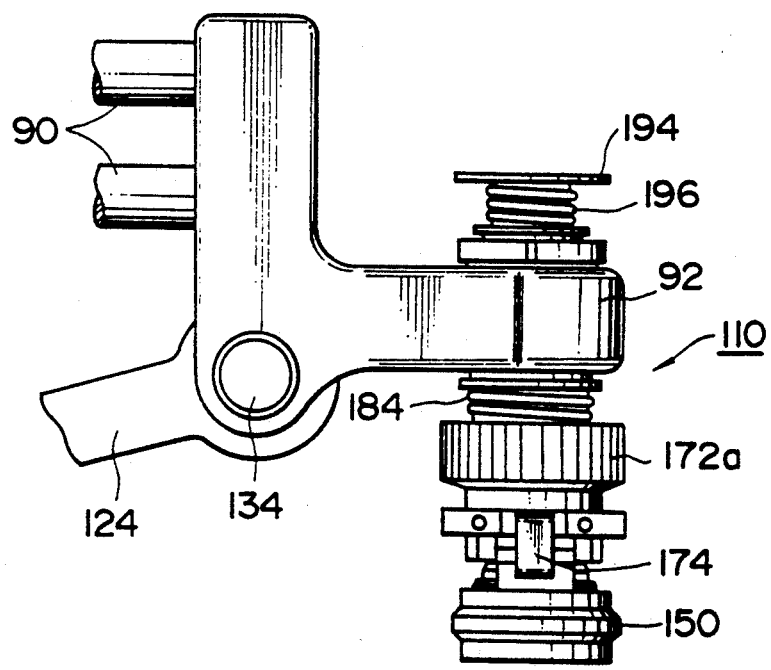
FIG. 8 is an elevational view of a coupling.
Figure 9:
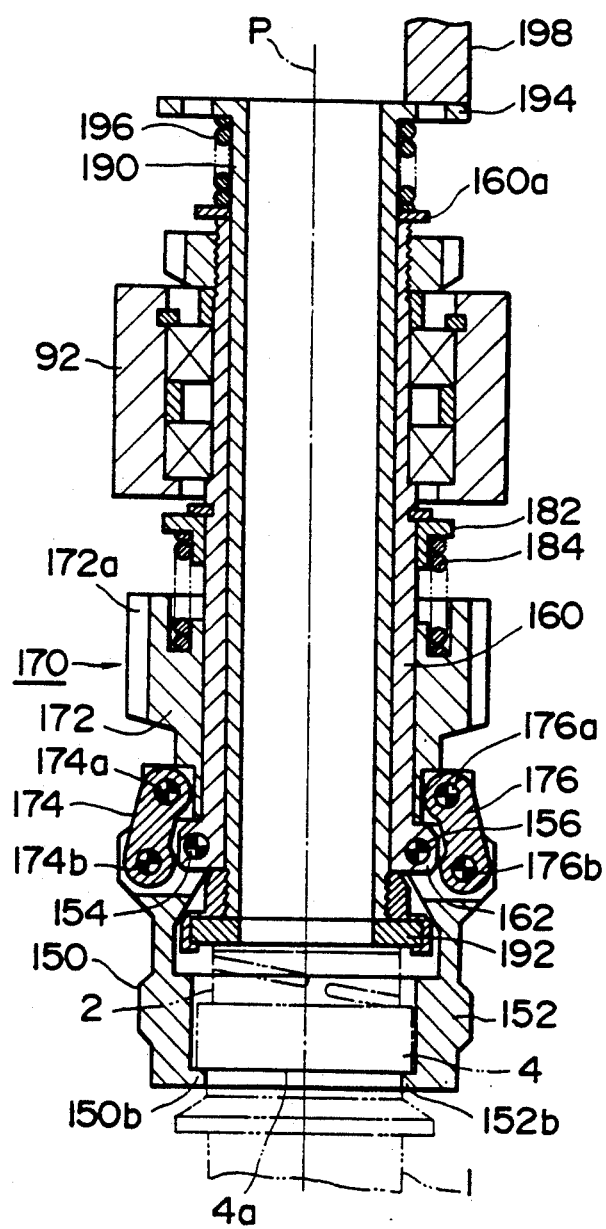
FIG. 9 is a sectional view of clamps which are rotating so as to approach each other.
Figure 10:
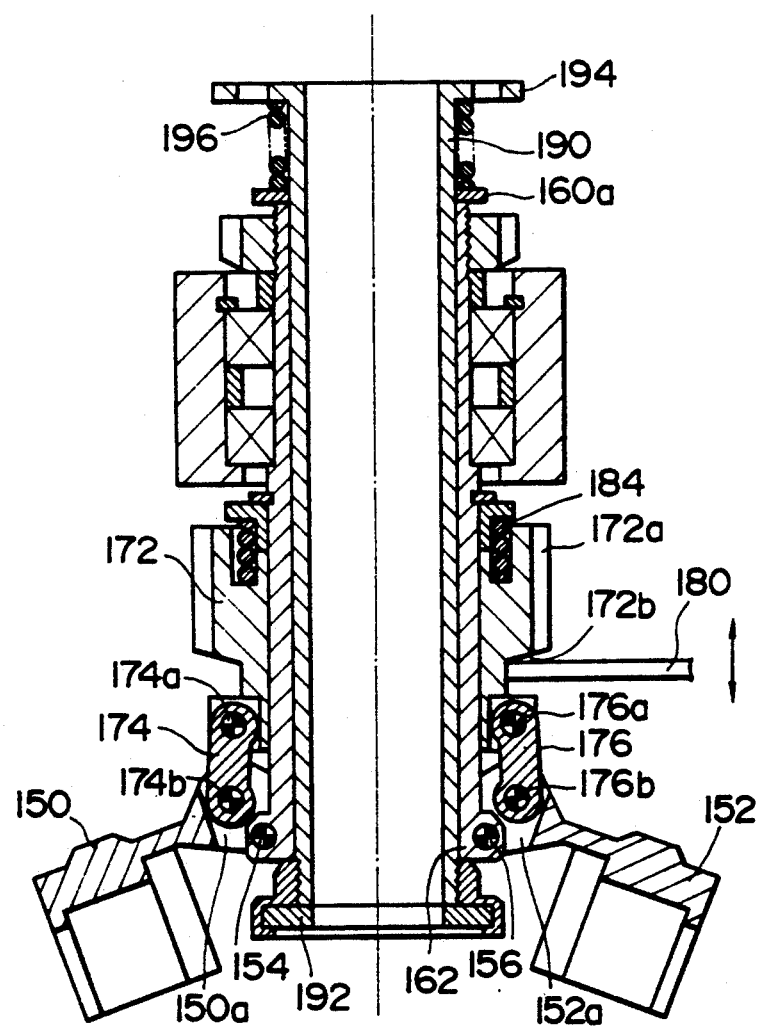
FIG. 10 is a sectional view of clamps which are rotating so as to separate from each other.

A preferred example of the coupling 110 will now be explained with reference to FIGS. 8 to 10.

Two clamps 150, 152 for holding the preform 1 are provided at the lower end of the coupling 110. The two clamps 150, 152 are supported in such a manner as to be rotatable in the opposite directions to each other. For this purpose, the two clamps 150, 152 have drag hinges 154, 156, respectively. The drag hinges 154, 156 are hinged on a fixed ring 162 which is provided integrally with a fixed cylinder 160. The drag hinges 154, 156 are opposed to each other on the diameter of the fixed ring 162.

A rotational control mechanism 170 for the two clamps 150, 152 is constituted by a slip ring 172 which is supported by the periphery of the fixed cylinder 160 in such a manner as to move in the longitudinal direction thereof. A gear 172a is provided on the outer periphery of the slip ring 172. At the lower end of the slip ring 172, levers 174, 176 are supported in such a manner as to be opposed to each other on the diameter of the slip ring 172 and to be rotatable at the upper rotational points 174a, 176a, respectively. The levers 174, 176 extend downwardly toward the fixed ring 162 and are hinged on the clamps 150, 152, respectively, in such a manner as to be rotatable at the lower rotational points 174b, 176b, respectively. In this case, the upper rotational points 174a, 176a and the lower rotational points 174b, 176b are so selected that the imaginary lines connecting the upper and lower rotational points do not pass the drag hinges 154, 156, respectively, either in the state in which the clamps 150, 152 are rotating so as to approach each other or in the state in which the clamps 150, 152 are rotating so as to separate from each other. In this way, it is possible to prevent the centers of the rotation of the levers 174, 176 from being situated at the dead points either in the state in which the clamps 150, 152 are rotating so as to approach each other or in the state in which the clamps 150, 152 are rotating so as to separate from each other. As a result, it is possible to preclude the possibility of the levers 174, 176 being stuck to the dead points when the clamps 150, 152 should be rotated in accordance with the movement of the slip ring 172.

In order to ensure the advance of the levers 174, 176 which keeps away from the dead points, the lower rotational points 174b, 176b are disposed at positions outside of the imaginary lines which connect the upper rotational points 174a, 176a to the drag hinges 154, 156, respectively, viewed from the center line P of the fixed cylinder 160 in the state in which the clamps 150, 152 are rotating so as to separate from each other.

When the slip ring 172 on the fixed cylinder 160 moves, the levers 174, 176 rotate around the upper rotational points 174a, 176a, respectively, and the lower rotational points 174b, 176b, respectively. At this time, the force which rotates connecting pieces 150a, 152a around the drag hinges 154, 156, respectively, acts on the connecting pieces 150a, 152a.

In order to impart the slipping motion to the slip ring 172 on the fixed cylinder 160, a push-up member such as a plate 180 is provided. The plate 180 comes into contact with the under surface 172b of the slip ring 172 and pushes up the slip ring 172 so as to keep the slip ring 172 away from the fixed ring 162. The slip ring 172 is lowered by a spring 184 which is supported by a projection ring 182. The spring 184 assumes the compressed state while the clamps 150, 152 are rotating so as to separate from the preform 1 while it assumes the loosened state while the clamps 150, 152 are rotating so as to approach each other and hold the neck portion 2 of the preform 1.

The projection ring 182 is provided above the slip ring 172 on the fixed cylinder 160. The support section 92 is provided above the projection ring 182 and the fixed cylinder 160 is rotatably attached to the support section 92. The fixed cylinder 160 is made rotatable in order to rotate the preform 1 at the heating stations 142 and 144. The rotating force is transmitted through the gear 172a provided on the slip ring 172.

A movable cylinder 190 which is vertically movable is disposed on the inside of the fixed cylinder 160. A packing 192 which comes into close contact with the neck portion 2 of the preform 1 is provided at the lower end of the movable cylinder 190. At the upper end of the movable cylinder 190 is provided a flange 194, and a compressed coil spring 196 is disposed between the upper flange 160a of the fixed cylinder 160 and the flange 194 of the movable cylinder 190. The movable cylinder 190 is made movable in order to obtain a good adhesion between the packing 192 and the upper surface of the neck portion 2 of the preform 1 at the time of blow molding at the stretching blow molding station 146. At the stretching blow molding station 146, a core member 198 presses down the flange 194 of the movable cylinder 190 and brings the packing 192 into close contact with the upper surface of the neck portion 2 by utilizing the resilient force of the spring 196. As a result, it is possible to prevent the leakage of a pressure medium when the pressure medium is introduced into the inside of the movable cylinder 190 and supplied to the preform 1.

In order to connect the preform 1 with the clamps 150, 152 with reliability, the clamps 150, 152 are formed in conformity with the configuration of the neck portion of the preform 1. In this way, the clamps 150, 152 can surround the neck portion 2 with reliability when they are rotating so as to approach each other and suppress the swell of the neck portion 2 when the pressure medium is introduced. To this end, the clamps 150, 152 are formed into a semicylinder and the inner sections of the clamps 150, 152 correspond to the outer section of the neck portion 2 of the preform 1.

The preform 1 generally has a large-diameter portion 4 under the neck portion 1. The clamps 150, 152 hold the preform 1 without dropping it by supporting the under surface 4a of the large-diameter portion 4. For this purpose, the clamps 150, 152 have receiving surfaces 150b, 152b, respectively, for supporting the under surface 4a of the large-diameter portion 4.

By virtue of the inner configurations and the receiving portions 150b, 152b of the clamps 150, 152, it is possible to carry the preform 1 with reliability without slipping it down during the feeding operation. In addition, since it is possible to control the rotational motions of the clamps 150, 152 with swiftness and great accuracy, it is possible to connect and release the preform 1 with swiftness. Especially, the approaching rotational motions of the clamps 150, 152 can be so controlled as to be started with the approach of the support arm 60 to the preform 1 and to be finished at the moment the preform 1 is situated below the clamps 150, 152. Since it is also possible to execute the separating rotational motions of the clamps 150, 152 with swiftness, it is possible to eject a finished bottle with swiftness which has been subjected to blow molding, and the approaching rotational motions of the clamps 150, 152 for holding a new preform 1 can be started during the feeding process of the support arm 60.

The mechanism for handing the preform 1 to the coupling 110 at the preform receiving station 140 will now be explained.

Figure 11:
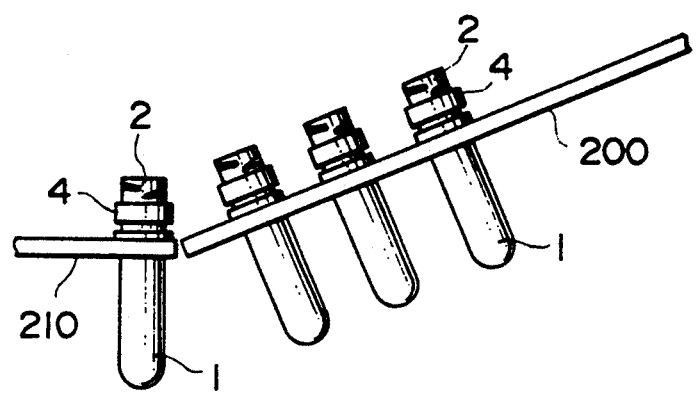
FIG. 11 is a schematic explanatory view of a preform receiving station.
Figure 12:
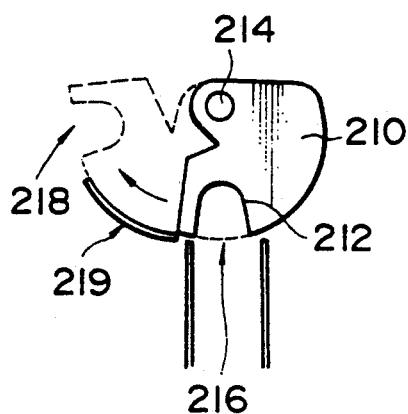
FIG. 12 is a plan view of the preform receiving station shown in FIG. 11.

A shoot 200 shown in FIG. 6 is disposed in an inclined manner, as shown in FIG. 11, and the preform 1 is guided through the shoot 200. At the lower end of the shoot 200, a handing member 210 having a U-shaped notch 212 is rockably disposed around a shaft 214, as shown in FIG. 12. In the state in which the handing member 210 is disposed at the position (supplying position 216) indicated by the solid line, the handing member 210 receives one preform 1 from the shoot 200 at the U-shaped notch 212 and is rocked to the position (handing position 218) indicated by the broken line at which the preform 1 is handed to the coupling 110. The handing member 210 is vertically movable at the handing position 218. A guide 219 is provided in order to prevent the preform 1 from springing from the handing member 210 by the centrifugal force during the travel from the supplying position 216 to the handing position 218.

Figure 13:
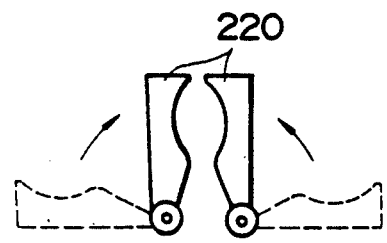
FIG. 13 is a schematic plan view of a slip ring push-up member disposed in a preform receiving station.
Figure 14:
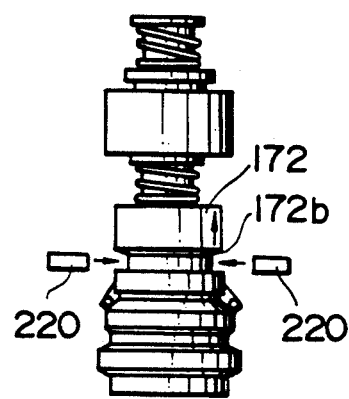
FIG. 14 is a schematic explanatory view of the relationship between a slip ring and a slip ring push-up member.

A pair of arms 220 which constitute a push-up member are vertically rotatably provided above the handing position 218, as shown in FIG. 13. The pair of arms 220 are disposed at the position which faces the under surface 172b of the slip ring 172 when the coupling 110 which has finished the ejecting operation has reached the handing position 218 and the arms 220 are rocked so as to approach each other, as shown in FIG. 14. When the pair of arms 220 are moved upward, the slip ring 172 is lifted, whereby the clamps 150, 152 are rotated so as to separate from each other. Thereafter, the handing member 210 holding a new preform 1 is elevated and the neck portion 2 of the preform 1 is set at the position which allows the clamps 150, 152 to hold the neck portion 2. When the pair of arms 220 are lowered again, the clamps 150, 152 rotate so as to approach each other so as to enable the coupling 110 to receive the preform 1.

The ejecting operation of the ejecting station 178 will be explained in the following.

Figure 15:
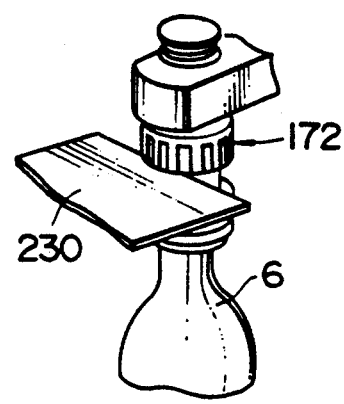
FIG. 15 is a schematic perspective view of a slip ring push-up member disposed in an ejecting station.
Figure 16:
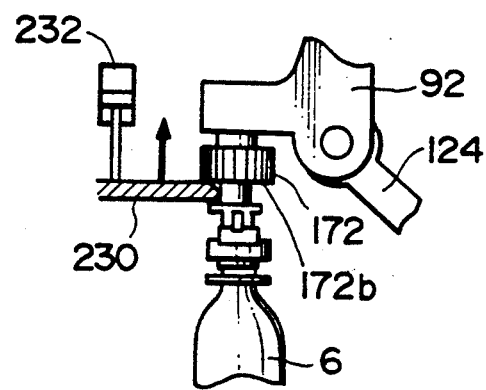
FIG. 16 is a schematic elevational view of the slip ring push-up member disposed in the ejecting station shown in FIG. 15.

When the coupling 110 holding a blow molded bottle 6 passes the ejecting station 178, an ejecting plate 230 as a push-up member is inserted below the under surface 172b of the slip ring 172, as shown in FIG. 15. The ejecting plate 230 is elevated by a cylinder 232 so as to elevate the slip ring 172, as shown in FIG. 16, thereby rotating the clamps 150, 152 so as to separate from each other. As a result, the bottle 6 drops, whereby the ejecting operation is completed.

When the coupling 110 having the above-described structure is applied to a carrying apparatus which accelerates and decelerates the movement of the support arm 60, great shortening of the forming cycle is realized. However, when the coupling 110 is applied to a carrying apparatus having another feeding system, it is also effective for the speed-up of the reception and ejection of a preform.

It is also possible to dispose the clamps 150, 152 at the upper end of the coupling 110 so as to hold and carry the neck portion 2 of the preform 1 in an inverted state.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A preform carrying apparatus for carrying a preform held by a coupling along a passage on which working stations are provided, said coupling comprising:
   a plurality of clamps wherein each of said clamps is hinged on a fixed cylinder for holding a neck portion of said preform, said clamps being formed to surround said neck portion and being provided at the inner wall surfaces thereof with receiving portions which come into all-round contact with an under surface of a large diameter portion formed at said neck portion, and which are hinged so as to be released from said neck portion by rotation; and
   a rotation control mechanism for rotating each of said clamps in a first direction which brings said clamps close to each other and in a second direction which separates said clamps from each other,
   whereby when said plurality of clamps rotate so as to approach each other, said clamps surround said neck portion, while when said clamps rotate so as to separate from each other, said clamps are released from said neck portion, wherein said rotation control mechanism comprises a slip ring which vertically moves along said fixed cylinder and a lever with both ends thereof rotatably supported by said slip ring and said fixed cylinder, respectively, such that said clamps are rotated so as to separate from each other when said slip ring is elevated while said clamps are rotated so as to approach each other when said slip ring is lowered; and said coupling further comprises a spring which presses said slip ring so as to be constantly lowered, thereby maintaining said clamps in the state of being close to approach each other, and a slip ring push-up member provided on each of said working stations in order to rotate said clamps so as to separate from each other.

2. A preform carrying apparatus according to claim 1, wherein the imaginary line connecting the upper rotational point at which said lever is connected to said slip ring and the lower rotational point at which said lever is connected to said clamp is so selected as not to pass the hinged portion of said clamp and said fixed cylinder either in the state in which said clamps are rotating so as to approach each other or in the state in which said clamps are rotating so as to separate from each other.

3. A preform carrying apparatus according to claim 1, wherein said fixed cylinder is provided on the inside thereof with a movable cylinder which is vertically movable and which can introduce a pressure medium for blow molding.

4. A preform carrying apparatus according to claim 3, wherein said movable cylinder is provided at the lower end thereof with a packing which comes into close contact with the upper surface of said neck portion.

5. A preform carrying apparatus according to claim 3, wherein said fixed cylinder and said movable cylinder which protrudes upwardly from said fixed cylinder are provided at the respective upper ends with flanges, a spring is provided between said flanges, and a member for pressing down said flange of said movable cylinder is provided at a blow molding station, which is one of said working stations.

6. A preform carrying apparatus according to claim 1, wherein said fixed cylinder is rotatably supported by a carrying arm for carrying said coupling and rotates said preform by the driving force supplied from a driving portion provided on a heating station, which is one of said working stations.

7. A preform carrying apparatus according to claim 1, wherein the working stations provided along the passage include a plurality of stretch blow molding stations.

8. A preform carrying apparatus according to claim 7, wherein the working stations include at least one heating station, at least one preform receiving station and at least one ejecting station.

9. A preform carrying apparatus according to claim 8, wherein the working station include a plurality of heating stations, a plurality of preform receiving stations and a plurality of ejecting stations.

10. A preform carrying apparatus according to claim 1, wherein the working stations include at least one stretch blow molding station, at least one heating station, at least one preform receiving station and at least one ejecting station.

* * * * *